(12) United States Patent
Hwang et al.

(10) Patent No.: US 8,149,659 B2
(45) Date of Patent: Apr. 3, 2012

(54) RECORDING AND/OR REPRODUCING APPARATUS, RECORDING AND/OR REPRODUCING METHOD AND INFORMATION STORAGE MEDIUM THEREFOR

(75) Inventors: Sung-hee Hwang, Seoul (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 12/026,153

(22) Filed: Feb. 5, 2008

(65) Prior Publication Data

US 2008/0123495 A1    May 29, 2008

Related U.S. Application Data

(63) Continuation of application No. 11/091,452, filed on Mar. 29, 2005, now abandoned.

(30) Foreign Application Priority Data

Jun. 12, 2004 (KR) .................................. 2004-43332

(51) Int. Cl.
    *G11B 7/00* (2006.01)
(52) U.S. Cl. .................................. 369/47.27; 369/47.51
(58) Field of Classification Search .................. 369/100, 369/275.3, 47.1, 53.22, 47.27, 44.26, 47.51, 369/47.52, 47.12
See application file for complete search history.

(56) References Cited

U.S. PATENT DOCUMENTS

| | | | |
|---|---|---|---|
| 5,502,702 A | 3/1996 | Nakajo | |
| 6,639,746 B1 | 10/2003 | Chung et al. | |
| 6,822,937 B2 | 11/2004 | Tsukagoshi et al. | |
| 7,038,982 B2 | 5/2006 | Schreurs et al. | |
| 7,088,667 B2 * | 8/2006 | Kobayashi | 369/275.3 |
| 7,102,970 B2 | 9/2006 | Ueki | |
| 7,161,881 B2 | 1/2007 | Pereira | |
| 7,317,678 B2 | 1/2008 | Kobayashi | |
| 7,394,742 B2 | 7/2008 | Ueki | |
| 7,394,743 B2 | 7/2008 | Ueki | |
| 2002/0021656 A1 * | 2/2002 | Tsukagoshi et al. | 369/275.3 |
| 2003/0021201 A1 | 1/2003 | Kobayashi | |

(Continued)

FOREIGN PATENT DOCUMENTS

CN      1701364      11/2005

(Continued)

OTHER PUBLICATIONS

Office Action issued in Korean Patent Application No. 2004-43332 on Jan. 17, 2006.

(Continued)

*Primary Examiner* — Nabil Hindi
(74) *Attorney, Agent, or Firm* — NSIP Law (57) ABSTRACT

A recording and/or reproducing apparatus, a recording and/or reproducing method, and an information storage medium, wherein the recording and/or reproducing apparatus includes: a writing and/or reading unit writing data to or reading data from an information storage medium having one or more information recording layers; and a control unit controlling the writing and/or reading unit to write the data to the information storage medium by referring to one or more disk information structures including recording related parameter information corresponding to recording characteristics of the information storage medium, and recording characteristic information to which the recording related parameters are applied. According to the apparatus and method, parameters of recording characteristics appropriate to a recording and/or reproducing apparatus and compatibility between different specifications can be achieved.

3 Claims, 9 Drawing Sheets

U.S. PATENT DOCUMENTS

| | | | |
|---|---|---|---|
| 2003/0086345 A1* | 5/2003 | Ueki | 369/47.51 |
| 2003/0133376 A1 | 7/2003 | Matsumoto | |
| 2003/0137915 A1 | 7/2003 | Shoji et al. | |
| 2003/0223339 A1 | 12/2003 | Taniguchi et al. | |
| 2004/0156294 A1 | 8/2004 | Watanabe et al. | |
| 2005/0007913 A1 | 1/2005 | Kim et al. | |
| 2005/0007916 A1* | 1/2005 | Kim et al. | 369/47.27 |
| 2005/0007917 A1 | 1/2005 | Kim et al. | |
| 2005/0007920 A1 | 1/2005 | Kim et al. | |
| 2005/0007923 A1 | 1/2005 | Kim et al. | |
| 2005/0018566 A1 | 1/2005 | Kim et al. | |
| 2005/0105421 A1 | 5/2005 | Nijboer et al. | |
| 2006/0104193 A1 | 5/2006 | Sasaki et al. | |
| 2006/0176791 A1 | 8/2006 | Ueki | |
| 2006/0176794 A1 | 8/2006 | Ueki | |
| 2006/0227698 A1 | 10/2006 | Kobayashi | |

FOREIGN PATENT DOCUMENTS

| | | | |
|---|---|---|---|
| CN | 1853228 | | 10/2006 |
| EP | 1 233 409 | | 11/2004 |
| JP | 2002-050053 | | 2/2002 |
| JP | 2002-245625 | * | 8/2002 |
| JP | 2003-045036 | | 2/2003 |
| JP | 2003-203341 | | 7/2003 |
| WO | WO 02/086873 | | 10/2002 |
| WO | WO 03/030153 | | 4/2003 |
| WO | WO 03/075265 | | 9/2003 |
| WO | WO 2005/001819 A1 | | 1/2005 |
| WO | WO 2005/004134 A1 | | 1/2005 |
| WO | WO 2005/017879 | | 2/2005 |
| WO | WO 2005/029472 | | 3/2005 |

OTHER PUBLICATIONS

Australian Patent Office Search Report issued Feb. 9, 2006 re: Singaporean Patent Application No. 200502898-0 (8pp).
U.S. Appl. No. 11/091,452, filed Mar. 29, 2005, Sung-hee Hwang, et al., Samsung Electronics Co., Ltd.
U.S. Appl. No. 12/026,101, filed Feb. 5, 2008, Sung-hee Hwang, et al., Samsung Electronics Co., Ltd.
U.S. Appl. No. 12/026,114, filed Feb. 5, 2008, Sung-hee Hwang, et al., Samsung Eectronics Co., Ltd.
U.S. Appl. No. 12/026,130, filed Feb. 5, 2008, Sung-hee Hwang, et al., Samsung Electronics Co., Ltd.
Chinese Office Action issued May 8, 2009.
Taiwanese Office Action dated Jun. 10, 2009.
Japanese Office Action dated Oct. 27, 2009, issued by the Japanese Patent Office in corresponding Japanese Patent Office in corresponding Japanese Patent Application No. 2005-170061.
Japanese Office Action issued on Mar. 2, 2010, in corresponding Japanese Application No. 2005-170061 (2 pages).
European Office Action issued on Mar. 18, 2011, in counterpart European Application No. EP 05 253 508.5 (9 pages, in English).
*Standard ECMA-338: 80 mm (1,46 Gbytes per side) and 120 mm (4,70 Gbytes per side) DVD Re-recordable Disk (DVD-RW)*, Dec. 2002, complete document (160 pages, including pp. i-vi, 1-148, and 6 unnumbered pages), note particularly sections 14.3, 26.1.3.2, Ecma International, Geneva, Switzerland.
European Search Report issued on Dec. 23, 2010, in counterpart European Patent Application No. 05253508.5 (4 pages).
Office Action dated Jan. 18, 2008 of the Chinese Patent Application No. 200510075189.1.
Chinese Office Action issued on May 8, 2009, in counterpart Chinese Application No. 2007101269138 (5 pages, in Chinese, no English translation).
Taiwan Office Action issued on Jun. 10, 2009, in counterpart Taiwan Application No. 094115170 (17 pages, in Chinese, including complete English translation).
Japanese Office Action issued on May 17, 2011, in counterpart Japanese Application No. 2005-170061 (5 pages, in English, including complete English translation of substantive portion).
Japanese Office Action issued on Sep. 6, 2011, in counterpart Japanese Application No. 2008-34897 (5 pages in Japanese, including complete English translation).
Mexican Office Action issued Oct. 5, 2011, in counterpart Mexican Application No. MX/a/2008/004546 (4 pages, in Spanish, including English translation of substantive portion).
Mexican Office Action issued on Oct. 6, 2011, in counterpart Mexican Application No. MX/a/2008/004547 (4 pages, in Spanish, including English translation of substantive portion).
Indian First Examination Report issued Nov. 8, 2011, in counterpart Indian Application No. 1257/DEL/2005 (2 pp, in English).
Russian Office Action issued Nov. 30, 2011, in counterpart Russian Application No. 2008102396/28(002612) (6 pp, including English translation).
Russian Office Action issued Dec. 6, 2011, in counterpart Russian Application No. 2008102397/28(002613) (6 pp, including English translation).

* cited by examiner

| | | |
|---|---|---|
| DISK INFORMATION STRUCTURE #1 (510) | COMMON INFORMATION TABLE (511) | (···, STORAGE MEDIUM TYPE, NUMBER OF INFORMATION STORAGE LAYERS, SUPPORTED RECORDING SPEED, ···) =(···, RE-WRITING, 2, 1, ···) |
| | PARAMETER RECOGNITION INFORMATION TABLE (512) | (···, RECORDING SPEED, RECORDING LAYER, WS INDICATION INFORMATION, ···) = (1,1,1) |
| | ... | ... |
| | PARAMETER TABLE (513) | (···, RECORDING SPEED, RECORDING LAYER, WS INDICATION INFORMATION,···) = RECORDING RELATED PARAMETER INFORMATION ON (1,1,1) |
| DISK INFORMATION STRUCTURE #2 (520) | COMMON INFORMATION TABLE (521) | (···, STORAGE MEDIUM TYPE, NUMBER OF INFORMATION STORAGE LAYERS, SUPPORTED RECORDING SPEED, ···) =(···, RE-WRITING, 2, 1, ···) |
| | PARAMETER RECOGNITION INFORMATION TABLE (522) | (···, RECORDING SPEED, RECORDING LAYER, WS INDICATION INFORMATION, ···) = (1,2,1) |
| | ... | ... |
| | PARAMETER TABLE (523) | (···, RECORDING SPEED, RECORDING LAYER, WS INDICATION INFORMATION, ···) = RECORDING RELATED PARAMETER INFORMATION ON (1,2,1) |

FIG. 6

| | | ... |
|---|---|---|
| FIRST DISK INFORMATION STRUCTURE #1 (610) | PARAMETER RECOGNITION INFORMATION TABLE (611) | P = (1, 1, 1) |
| | PARAMETER TABLE (612) | RECORDING RELATED PARAMETER INFORMATION ON P=(1, 1, 1) |
| | | ... |
| SECOND DISK INFORMATION STRUCTURE #2 (620) | PARAMETER RECOGNITION INFORMATION TABLE (621) | P = (1, 2, 1) |
| | PARAMETER TABLE (622) | RECORDING RELATED PARAMETER INFORMATION ON P=(1,2,1) |
| | | ... |
| THIRD DISK INFORMATION STRUCTURE #3 (630) | PARAMETER RECOGNITION INFORMATION TABLE (631) | P = (2, 1, 2) |
| | PARAMETER TABLE (632) | RECORDING RELATED PARAMETER INFORMATION ON P=(2, 1, 2) |
| | | ... |
| FOURTH DISK INFORMATION STRUCTURE #4 (640) | PARAMETER RECOGNITION INFORMATION TABLE (641) | P = (2, 2, 2) |
| | PARAMETER TABLE (642) | RECORDING RELATED PARAMETER INFORMATION ON P=(2, 2, 2) |

FIG. 7

| DISK INFORMATION STRUCTURE #1 (710) | PARAMETER RECOGNITION INFORMATION TABLE (711) | P = (1, 1, 1) |
| --- | --- | --- |
| | PARAMETER TABLE (712) | RECORDING RELATED PARAMETER INFORMATION ON P=(1, 1, 1) |
| DISK INFORMATION STRUCTURE #2 (720) | PARAMETER RECOGNITION INFORMATION TABLE (721) | P = (1, 2, 1) |
| | PARAMETER TABLE (722) | RECORDING RELATED PARAMETER INFORMATION ON P=(1, 2, 1) |
| DISK INFORMATION STRUCTURE #3 (730) | PARAMETER RECOGNITION INFORMATION TABLE (731) | P = (2, 1, 2) |
| | PARAMETER TABLE (732) | RECORDING RELATED PARAMETER INFORMATION ON P=(2, 1, 2) |
| DISK INFORMATION STRUCTURE #4 (740) | PARAMETER RECOGNITION INFORMATION TABLE (741) | P = (2, 2, 2) |
| | PARAMETER TABLE (742) | RECORDING RELATED PARAMETER INFORMATION ON P=(2, 2, 2) |
| DISK INFORMATION STRUCTURE #5 (750) | PARAMETER RECOGNITION INFORMATION TABLE (751) | P = (2, 1, 3) |
| | PARAMETER TABLE (752) | RECORDING RELATED PARAMETER INFORMATION ON P=(2, 1, 3) |
| DISK INFORMATION STRUCTURE #6 (760) | PARAMETER RECOGNITION INFORMATION TABLE (761) | P = (2, 2, 3) |
| | PARAMETER TABLE (762) | RECORDING RELATED PARAMETER INFORMATION ON P=(2, 2, 3) |
| DISK INFORMATION STRUCTURE #7 (770) | PARAMETER RECOGNITION INFORMATION TABLE (771) | P = (4, 1, 3) |
| | PARAMETER TABLE (772) | RECORDING RELATED PARAMETER INFORMATION ON P=(4, 1, 3) |
| DISK INFORMATION STRUCTURE #8 (780) | PARAMETER RECOGNITION INFORMATION TABLE (781) | P = (4, 2, 3) |
| | PARAMETER TABLE (782) | RECORDING RELATED PARAMETER INFORMATION ON P=(4, 2, 3) |

RECORDING AND/OR REPRODUCING APPARATUS, RECORDING AND/OR REPRODUCING METHOD AND INFORMATION STORAGE MEDIUM THEREFOR

CROSS-REFERENCE TO RELATED APPLICATIONS

This application is a continuation of application Ser. No. 11/091,452 filed on Mar. 29, 2005, now abandoned, which claims the benefit of Korean Patent Application No. 2004-43332 filed on Jun. 12, 2004, in the Korean Intellectual Property Office, the disclosure of which is incorporated herein by reference.

BACKGROUND OF THE INVENTION

1. Field of the Invention

The present invention relates to a recording and/or reproducing apparatus, a recording and/or reproducing method, and an information storage medium.

2. Description of the Related Art

Generally, an optical disk is widely used as an information storage medium in an optical pickup apparatus for recording and/or reproducing information. According to the information recording capacity, the optical disc is classified into a compact disk (CD) and a digital versatile disk (DVD). Optical disks capable of recording, deleting, and reproducing data include a 650MB CD-R, a CD-RW, and a 4.7 GB DVD+RW, and optical disks for reproducing data include a 650MB CD, and a 4.7 GB DVD-ROM. Furthermore, a HD-DVD having a recording capacity of over 25 GB is under development.

Due to recent developments of optical disk technologies, semiconductor technologies, and recording/reproducing strategies, addition of new functions and recording layers to an optical disk, and increases in a recording speed, standards for optical systems, including optical drive systems and optical disks need to be constantly updated.

Figure 1:
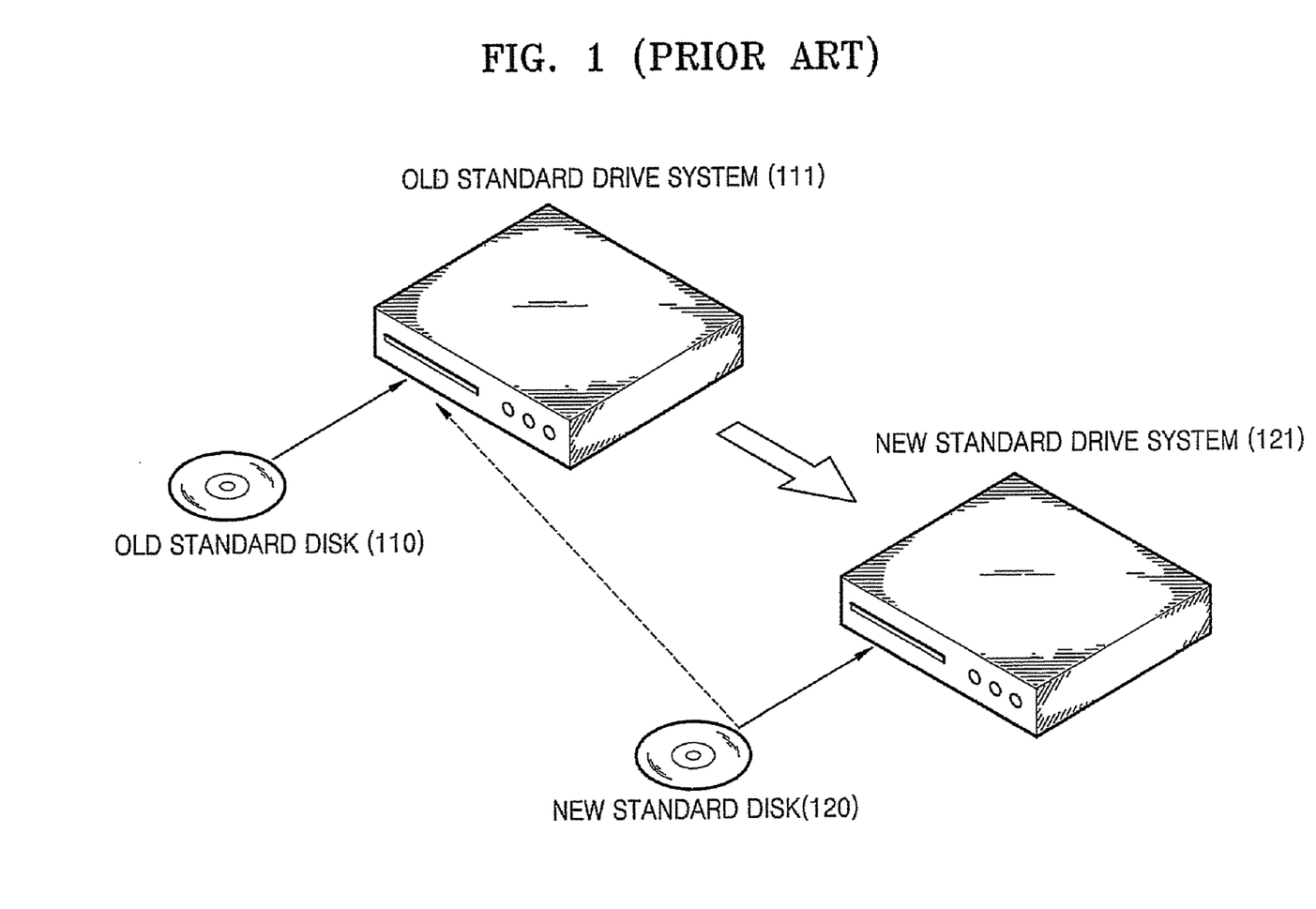
FIG. 1 is a reference diagram explaining the problem of disk compatibility according to the conventional technology.

FIG. 1 is a reference diagram explaining the problem of disk compatibility according to the conventional technology.

Assuming that a conventional standard is referred to as an 'old' standard and a standard updated by increasing the number of recording layers, increasing the recording speed or adding a write strategy to the old standard, is referred to as a 'new' standard, an old standard disk 110 is made to operate in an old standard drive system 111 and a new standard disk 120 is made to operate in a new standard drive system 121.

Due to the added characteristics, that is, the number of recording layers, the recording speed, or the write strategy, the old standard and the new standard may or may not be compatible for recording and/or reproducing data. The recording and/or reproducing compatibility of the two standards means that the old standard disk 110 used in the old standard drive system 111 can also be used in the new standard drive system 121 for data recording and/or reproducing. Also, it means that the new standard disk 120 used in the new standard drive system 121 can also be used in the old standard drive system 111 for data recording and/or reproducing.

In order to guarantee mutual recording and/or reproducing compatibility between the two standards, when the new standard disk 120 to which new functions are applied is loaded on the old standard drive system 111, the old standard drive system 111 needs to provide an appropriate treatment for the new function. For this, when the old standard is set up, an appropriate treatment for future addition of new characteristics should be prepared.

In addition, this appropriate treatment should be a generalized one that can be applied to the new standard, because it should be able to be applied even when the new standard is updated by adding another new characteristic.

Accordingly, in order for a series of different standards to be mutually compatible for recording and/or reproducing, preparation for addition of new characteristics should be performed when the standard is set up. For this, it is necessary to set up a rule by which a drive system operates in a known current standard, and a common rule by which the current drive system operates in the future standard and which is not known to the current standard.

That is, if the characteristic of a disk is recorded on the disk in the form of information that can be commonly recognized by different disk standards, even when a future disk to which a new characteristic is added is loaded on a current standard drive system, according to the information, recognizable information on the disk is read such that the disk can be used.

Accordingly, in order to guarantee flexibility and scalability of a disk information structure when variables such as a write strategy are added in addition to increasing the number of recording layers and the recording speed, a disk information structure and a recording method for a disk information structure are needed.

Also, when a plurality of disk information structures exists on one medium, there is a need to quickly find a disk information structure appropriate to the recording characteristic from a plurality of disk information structures.

SUMMARY OF THE INVENTION

According to an aspect of the present invention, there is provided a recording and/or reproducing apparatus, a recording and/or reproducing method, and an information storage medium by which a disk information structure can be quickly found and flexibility and scalability of the disk information structures can be guaranteed.

According to another aspect of the present invention, there is provided a recording and/or reproducing apparatus including: a writing and/or reading unit writing data to or reading data from an information storage medium having one or more information recording layers; and a control unit controlling the writing and/or reading unit to write data on the information storage medium by referring to one or more disk information structures including information on recording related parameters corresponding to recording characteristics of the information storage medium, and information on the recording characteristics to which the recording related parameters are applied.

According to an aspect of the present invention, the information of the recording characteristics may include at least one of a recording speed, a recording layer, and write strategy (WS) indication information.

According to an aspect of the present invention, the recording speed and the recording layer included in the information of the recording characteristics may indicate a recording speed and a recording layer to which recording related parameters in the disk information structure can be applied.

According to an aspect of the present invention, the WS indication information included in the information of the recording characteristics may indicate a WS of the recording related parameters in the disk information structure.

According to an aspect of the present invention, the WS indication information included in the information of the recording characteristics may indicate a combination of a predetermined WS and predetermined functions irrelevant to the WS.

According to an aspect of the present invention, the information storage medium may be any one of a reproduction dedicated type, a rewritable type, or a write once type.

According to an aspect of the present invention, in order to obtain recording related parameters appropriate to the recording and/or reproducing apparatus, the control unit may further find information of the recording characteristics of the recording and/or reproducing apparatus from information on the recording characteristics included in the one or more disk information structures.

According to an aspect of the present invention, the control unit may further determine a recording characteristic appropriate to the recording and/or reproducing apparatus, find disk information structure including the determined recording characteristic from one or more disk information structures, and control the writing and/or reading unit to write data to the information storage medium by using recording related parameters included in the found disk information structure.

According to another aspect of the present invention, there is provided a recording and/or reproducing method of recording data on and reading data from an information storage medium having one or more information recording layers, the method including: recording data on the information storage medium by referring to one or more disk information structures including information of recording related parameters corresponding to recording characteristics of the information storage medium, and information of the recording characteristics to which the recording related parameters are applied.

According to still another aspect of the present invention, there is provided an information storage medium having one or more information recording layers wherein one or more disk information structures including information of recording related parameters corresponding to recording characteristics of the information storage medium, and information of the recording characteristics to which the recording related parameters are applied are recorded in a predetermined area of the information storage medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
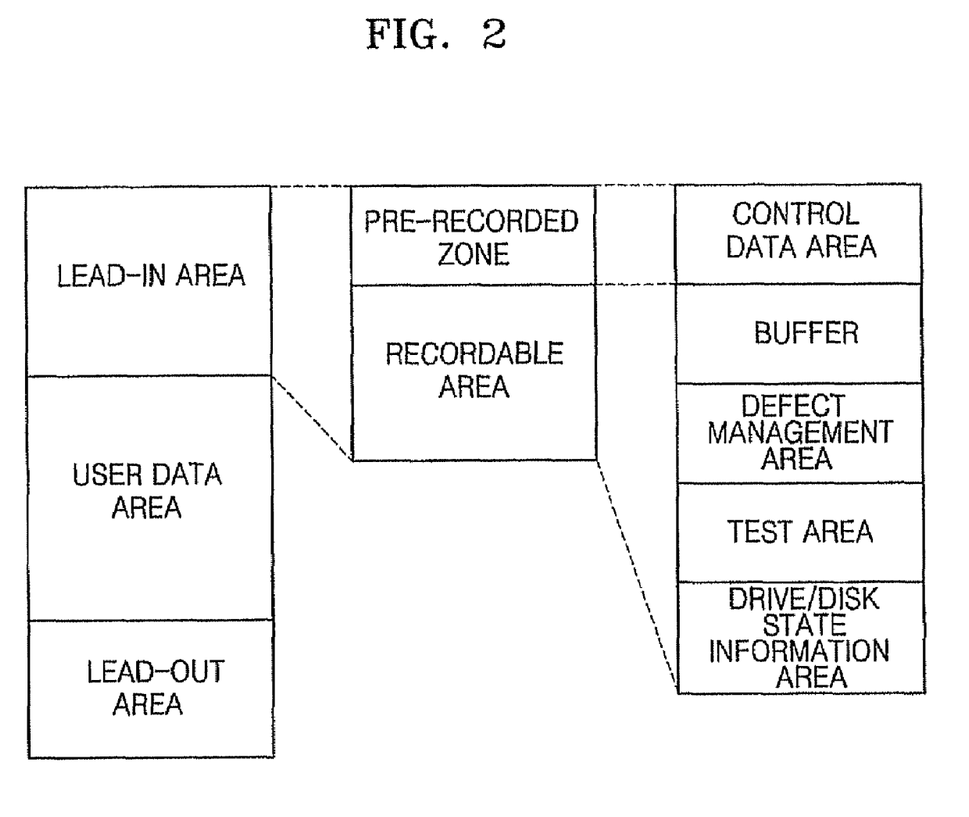
FIG. 2 is a diagram of the structure of a disk to which the present invention is applied.

Referring to FIG. 2, a lead-in area is disposed in the innermost circumference of the disk, a lead-out area is disposed in the outermost circumference of the disk, and a user data area in which user data is recorded is disposed between the lead-in area and the lead-out area.

The lead-in area is formed with a pre-recorded zone, in which predetermined information is recorded in advance when the disk is manufactured, and a recordable area.

The recordable area includes a buffer between the pre-recorded zone and the recordable area, a defect management area to record defect related information such as the address of replacement data replacing defective data occurring in the user data area, a test area disposed to perform a test to obtain an optical write power when data is recorded in the user data area, and a drive/disk state information area to record information related to the state of the drive or disk.

The pre-recorded zone is a control data area in which control data is recorded, and includes information on the disk type, version, disk size, disk structure, disk speed and recording parameters.

In this control data area, a disk information structure according to the present invention can be recorded. The disk information structure according to the present invention will now be explained with reference to FIG. 3.

Figure 3:
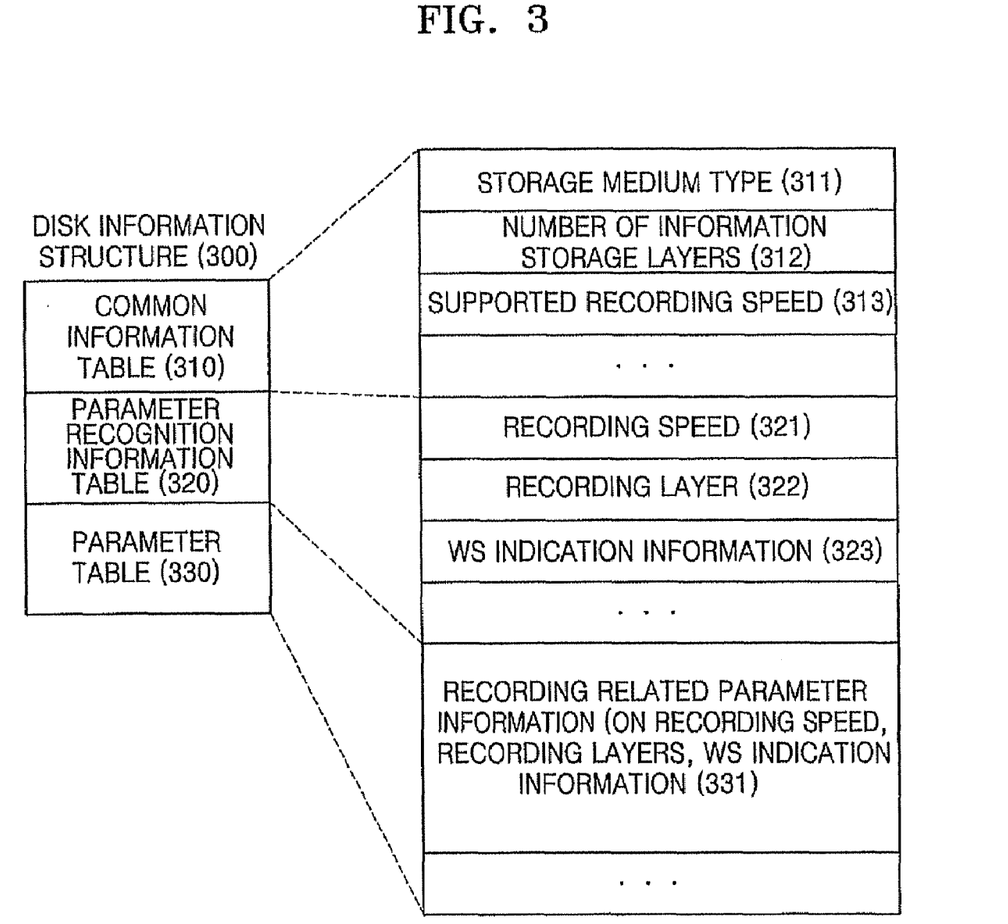
FIG. 3 is a diagram of the data structure of a disk information structure according to an embodiment of the present invention.

FIG. 3 is a diagram of the data structure of a disk information structure according to an embodiment of the present invention.

In an embodiment of the present invention, a disk information structure 300 is divided into a common information table 310, a parameter recognition information table 320, and a parameter table 330 as shown in FIG. 3 so that after a disk is placed on a drive, disk related information can be read most effectively.

The common information table 310 includes a type of a storage medium 311, a number of information storage layers 312, and a supported recording speed 313.

The type of a storage medium 311 indicates information on whether the medium is a write once medium, a rewritable medium, or a reproduction dedicated medium. The number of information storage layers 312 indicates the number of entire information storage layers the medium has. The supported recording speed 313 is information of the recording speed supported by the medium, and can be expressed by a lowest speed and a highest speed, or by individually supported recording speeds. For example, it can be expressed as 1×, 2×, 4×, or 6×.

The parameter recognition information table 320 includes a recording speed 321, and a recording layer 322, to which recording related parameters stored in the parameter table of this information structure are applied, and write strategy (WS) indication information 323 indicating which write strategy the recording related parameters are associated with.

The recording speed 321 refers to a recording speed, to which recording related parameters in the parameter table of this disk information structure are applied, and the recording layer 322 refers to a recording layer to which recording related parameters in the parameter table of this disk information structure are applied. The WS indication information 323 indicates which WS is recorded in the parameter table of this information structure. Of course, for this, a representative number for each WS should be predetermined.

Here, a representative number of a WS is not limited to one write strategy, and this representative number can be increased into multiple numbers as the standard is upgraded by adding other information irrelevant to the WS. In other words, when the first standard is set up, it can be determined that if write strategy indication information in the disk information structure of the disk for the standard indicates "1", recording related parameters in the parameter table of the disk information structure indicate WS A. After that time, if WS B is required as the standard is updated by adding a new transfer rate, the updated standard will have two WS, WS A and WS B. Since it cannot be said that only the new transfer rate and the accompanying WS are added when the standard is updated, addition of other information (Alpha) can be expected. Accordingly, it can be guaranteed that if WS indication information in the disk information structure of the disk for updated standard indicates "2", the recording related parameters in the parameter table of the disk information structure including the Alpha function, indicates WS A, or it can be guaranteed that if WS indication information in the disk information structure indicates "3", the recording related parameters in the parameter table of the disk information structure including the Alpha function, indicate WS B. Thus, the disk information structure will be recorded on the disk. When many different types of media, according to this standard update, are loaded on a drive system, and the disk information structures recorded on the media are reproduced, the drive system can identify if WS indication information is 1 or 2, the recording related parameters in the parameter table of the disk information structure indicate WS A, and if WS indication information is 3, the recording related parameters in the parameter table of the disk information structure indicate WS B. As the standard will be continuously updated, a representative number indicating WS A and a representing number indicating WS B can be added according to the settings used when the standard is first set up.

The parameter table 330 includes a pulse cycle (Ttop) when recording begins, a pulse cycle (Tmp) in the middle of recording, a pulse cycle (Tcl) when recording finishes, a recording power (Pw), a delete power (Pe), and a bias power (Pb), as recording parameters, and according to an embodiment of the present invention, includes a recording speed, a recording layer, and WS indication information, in particular. In addition, the parameter table 330 can include reproduction related parameters depending on the implementations.

Thus, in the disk information structure according to an embodiment of the present invention, by including the recording speed, the recording layer, and the WS indication information in the parameter recognition information table, which recording speed, which recording layer and what WS the disk information structure has, can be known by recognizing the parameter recognition information table. In other words, in order to quickly obtain recording related information, the present invention indicates which recording speed, recording layer, and WS are recorded in the parameter table of the disk information structure, by the parameter recognition information table.

For example, it is assumed that there are 2 recording layers, a supported recording speed is 1×, and there are two WS, WS1 and WS2. At this time, the disk drive can know which speed and recording layer the recording related parameters stored in the parameter table of this information structure are to be applied to, from the parameter recognition information table. Also, the disk drive can know which WS this disk information structure desires to apply, from the WS indication information without reading the recording related parameters stored in the parameter table. That is, in an embodiment of the present invention, a recording speed and a recording layer to be applied by this disk information structure are indicated in the recording speed field and recording layer field, respectively, in the parameter recognition information table, and the WS1 is indicated by WS indication information="1", and the WS2 is indicated by WS indication information="2". By doing so, the recording speed and the recording layer to which the recording related parameters stored in the parameter table are applied can be known, and even without reading information, such as Ttop, Tmp, and Tcl, in the parameter table one by one, it can be known at least which WS the recording related parameters stored in the parameter table of this disk information structure are about.

For example, assuming that the speed is 1×, and the drive system which desires to record data on recording layer 0 supports only WS1, in order to record the data, the drive system only needs to use parameters of WS1 specified in the parameter table of a disk information structure, after finding the disk information structure having disk information on speed 1×, recording layer 0, and disk information on WS1, from the parameter recognition information tables of respective disk information structures among disk information items. By doing so, when data is recorded, the drive system can quickly find required recording related parameter information from the parameter recognition information table such that the use of the disk can be improved.

Figure 4:
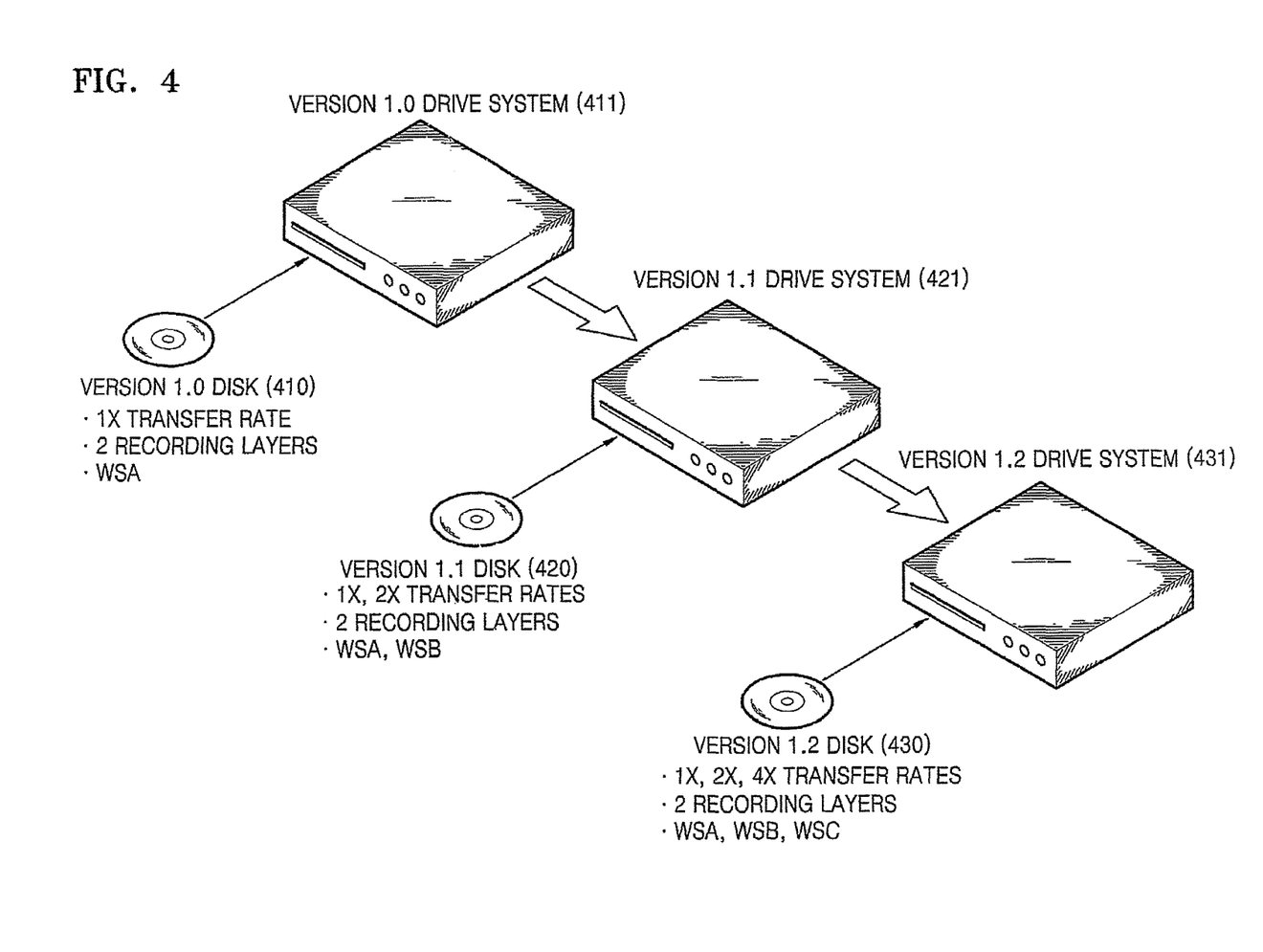
FIG. 4 is a reference diagram explaining compatibility of a disk information structure according to an embodiment of the present invention.

FIG. 4 is a reference diagram explaining compatibility of a disk information structure according to an embodiment of the present invention.

In the first standard, WS indication information that can be applied to the initial speed 1× is denoted "1". When a new transfer rate is added, that is, when adding a 2× speed when the first standard is updated to the second standard, new WS B that can be applied to speed 2× is added, the WS indication information is denoted "2". Also, when adding a 4× speed when the second standard is updated to the third standard, new WS C that can be applied to the 4× speed as well as 2× speed is denoted "3". Thus, by giving numbers sequentially in order of appearance of a WS, a plurality of WSes can be managed and compatibility among standards can be easily achieved.

That is, assuming that there are three types of WSes A, B, and C, and a WS indication rule is set as A=1, B=2, and C=3, if WS indication information is "1", it indicates WS A, if WS indication information is "2", it indicates WS B, and if WS indication information is "3", it indicates WS C.

Referring to FIG. 4, drive systems and disks of three standards (rewritable information storage media) are shown.

The version 1.0 disk 410 that complies with a first standard has characteristics of a 1× speed, 2 recording layers, and WS A. The version 1.1 disk 420 that complies with a second standard has characteristics of 1× and 2× speeds, 2 recording layers, and WS A and WS B. The version 1.2 disk 430 that complies with a third standard has characteristics of 1×, 2×, and 4× speeds, 2 recording layers, and WS A, WS B, and WS C.

Thus, assuming that the first standard is gradually updated to the third standard, the order by which disk information structures are recorded in a disk information area and the purpose of WS indication information will now be explained.

Figure 6:
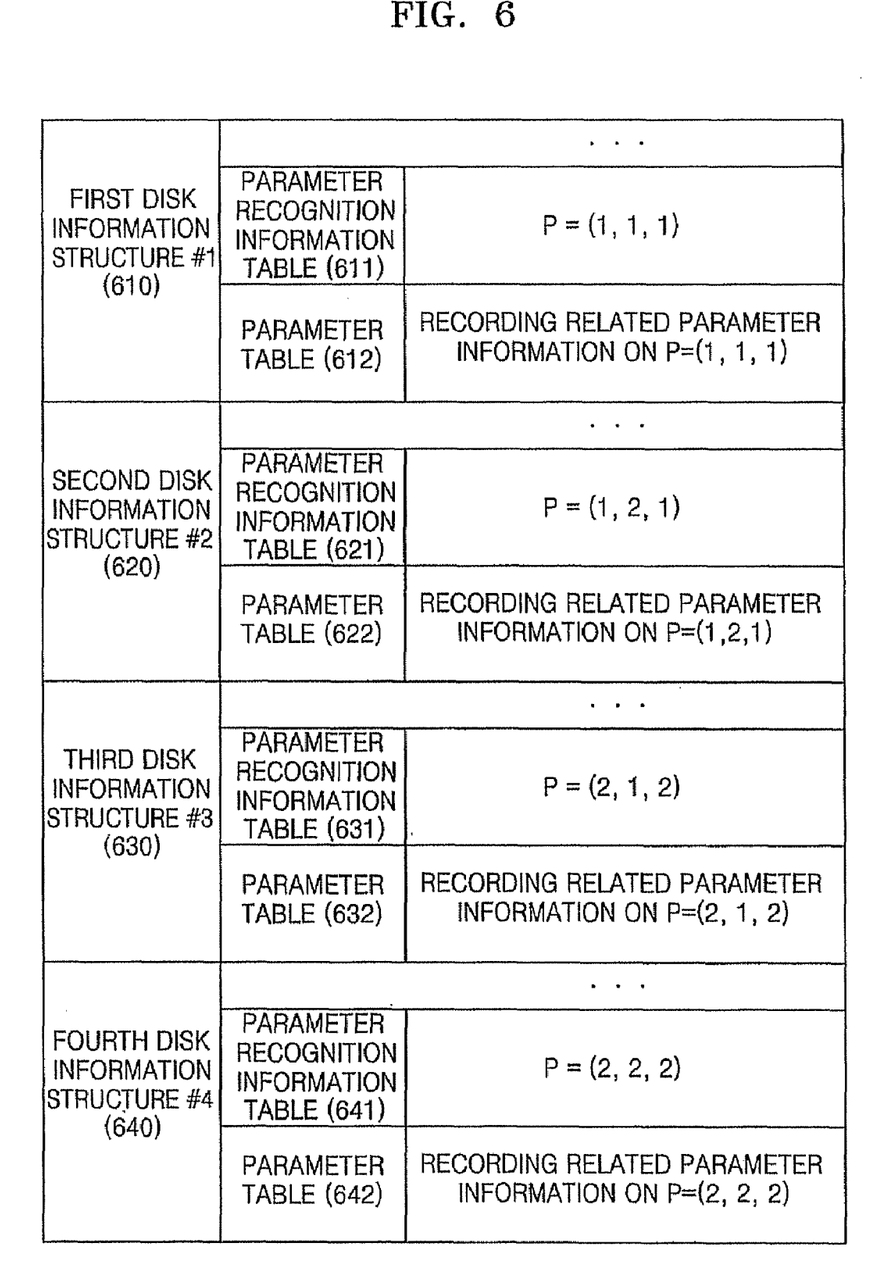
FIG. 6 is an example of a disk information structure which is recorded on a version 1.1 disk shown in FIG. 4.
Figure 7:
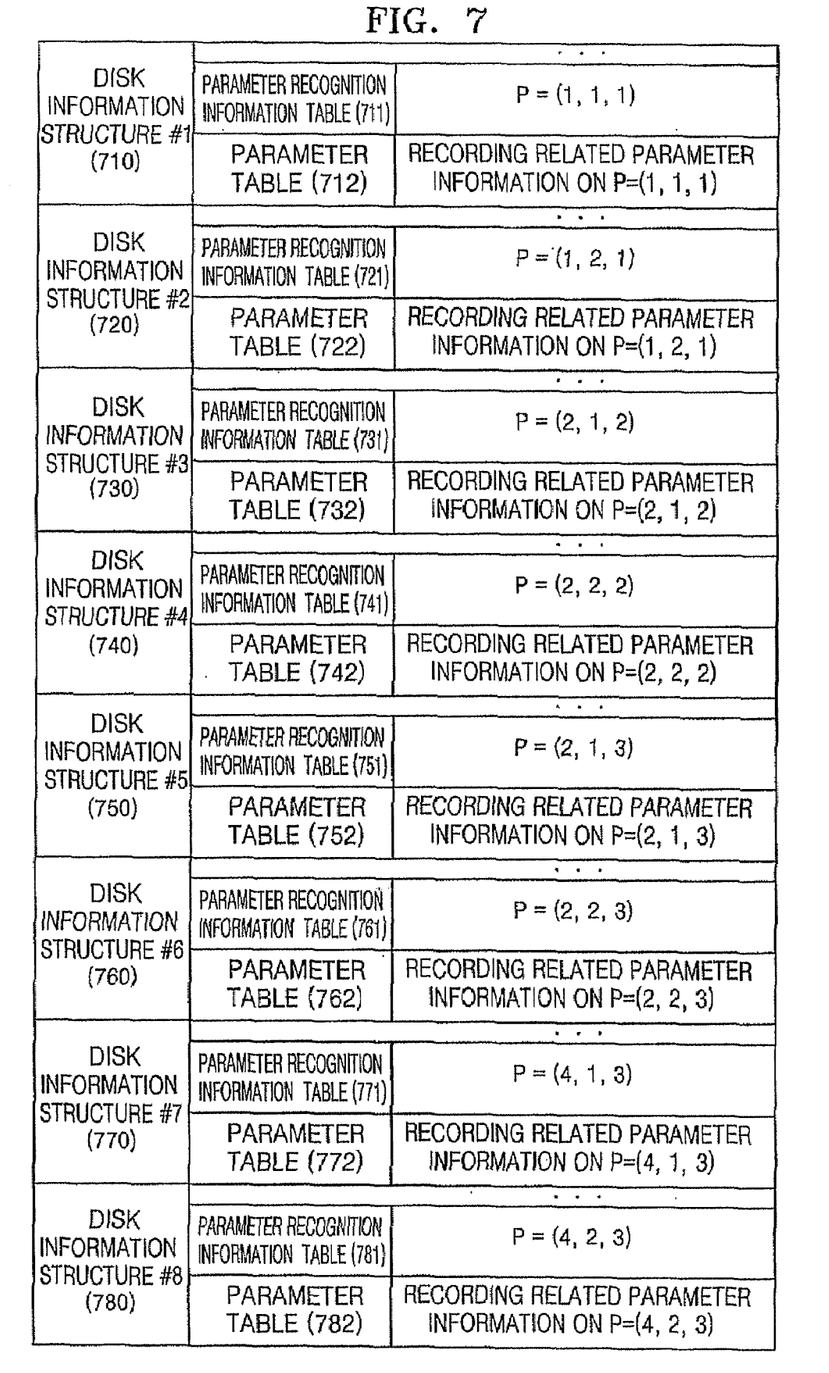
FIG. 7 is an example of a disk information structure which is recorded on a version 1.2 disk shown in FIG. 4.

First, for convenience of explanation, it is assumed that WS A can be applied to only a 1× speed in all standards, WS B can be applied to only 2× speed in the second and third standards, and WS C can be applied to only 2× and 4× speeds in the third standard. At this time, the available numbers of disk information structures recorded in a disk information area and recorded formats according to each standard are shown in FIGS. 5 through 7, respectively.

Figure 5:
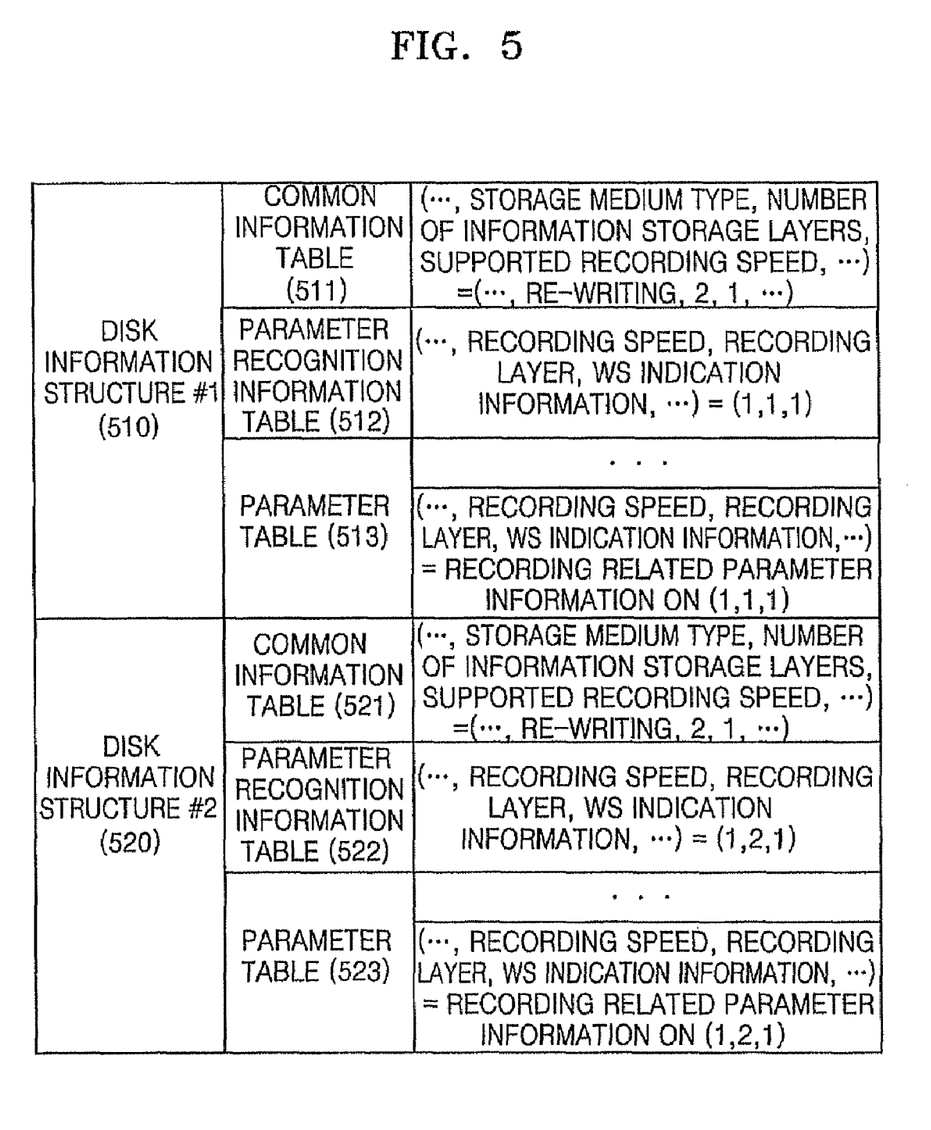
FIG. 5 is an example of a disk information structure which is recorded on a version 1.0 disk shown in FIG. 4.

FIG. 5 is an example of a disk information structure which is recorded on the version 1.0 disk shown in FIG. 4.

Referring to FIG. 5, the entire disk information structure includes disk information structures #1 510 and #2 520.

In both the common tables 511 and 521 of the disk information structure #1 510 and #2 520, it is recorded that storage medium type="rewritable", number of information storage layers="2" and supported recording speed="1".

In the parameter recognition information table 512 of the disk information structure #1 510, it is recorded that recording speed="1", recording layer="1", and WS indication information="1". In the parameter table 513, recording related parameter information on the information included in the parameter recognition information table 512, that is, (recording speed, recording layer, WS indication information)=(1,1,1), is recorded. Here, recording speed=1 indicates that the recording speed is 1×, and recording layer=1 indicates one of two recording layers, and WS indication information=1 indicates WS A.

In the parameter recognition information table 522 of the disk information structure #1, it is recorded that recording speed="1", recording layer="2", and WS indication information="1". In the parameter table 523, recording related parameter information on the information included in the parameter recognition information table 522, that is, (recording speed, recording layer, WS indication information)=(1,2,1), is recorded.

FIG. 6 is an example of a disk information structure which is recorded on the version 1.1 disk shown in FIG. 4.

Referring to FIG. 6, the entire disk information structure includes disk information structures #1 through #4 610 through 640.

In all the common tables (not shown) of the disk information structure #1 through #4 610 through 640, it can be recorded that storage medium type="rewritable", number of information storage layers="2" and supported recording speed="1, 2".

In the parameter recognition information table 611 of the disk information structure #1 610, it is recorded that recording speed="1", recording layer="1", and WS indication information="1". In the parameter table 612, recording related parameter information on the information included in the parameter recognition information table 611, that is, (recording speed, recording layer, WS indication information)=(1,1,1), is recorded. In FIG. 6, for convenience of explanation, an ordered set of P=(recording speed, recording layer, WS) is shown, and, for example, P=(V, L, N) indicates that a V× transfer rate, the L-th recording layer, and a WS named as N. As described above, the value of N to indicate a predetermined WS is not limited to one, and there can be a plurality of values by addition of new information or update of a standard according to a predetermined setting.

In the parameter recognition information table 621 of the disk information structure #2 620, recording speed="1", recording layer="2", and WS indication information="1," is recorded. In the parameter table 622, recording related parameter information on the information included in the parameter recognition information table 621, that is, (recording speed, recording layer, WS indication information)=(1,2,1), is recorded.

In the parameter recognition information table 631 of the disk information structure #3 630, recording speed="2", recording layer="1", and WS indication information="2," is recorded. In the parameter table 632, recording related parameter information on the information included in the parameter recognition information table 631, that is, (recording speed, recording layer, WS indication information)=(2,1,2), is recorded.

In the parameter recognition information table 641 of the disk information structure #4 640, recording speed="2", recording layer="2", and WS indication information="2," is recorded. In the parameter table 642, recording related parameter information on the information included in the parameter recognition information table 641, that is, (recording speed, recording layer, WS indication information)=(2,2,2), is recorded.

FIG. 7 is an example of a disk information structure which is recorded on the version 1.2 disk shown in FIG. 4.

Referring to FIG. 7, the entire disk information structure includes disk information structures #1 through #8 710 through 780.

In all the common tables (not shown) of the disk information structure #1 through #8 710 through 780, it can be recorded the storage medium type="rewritable", number of information storage layers="2" and supported recording speed="1, 2, 4".

In the parameter recognition information table 711 of the disk information structure #1 710, recording speed="1", recording layer="1", and WS indication information="1," is recorded. In the parameter table 712, recording related parameter information on the information included in the parameter recognition information table 711, that is, (recording speed, recording layer, WS indication information)=(1,1,1), is recorded. Here, recording speed=1 indicates that the recording speed is 1×, and recording layer=1 indicates one of two recording layers, and WS indication information=1 indicates WS A.

In the parameter recognition information table 721 of the disk information structure #2 720, recording speed="1", recording layer="2", and WS indication information="1," is recorded. In the parameter table 722, recording related parameter information on the information included in the parameter recognition information table 721, that is, (recording speed, recording layer, WS indication information)=(1,2,1), is recorded.

In the parameter recognition information table 731 of the disk information structure #3 730, recording speed="2", recording layer="1", and WS indication information="2," is recorded. In the parameter table 732, recording related parameter information on the information included in the parameter recognition information table 731, that is, (recording speed, recording layer, WS indication information)=(2,1,2), is recorded.

In the parameter recognition information table 741 of the disk information structure #4 740, recording speed="2", recording layer="2", and WS indication information="2," is recorded. In the parameter table 742, recording related parameter information on the information included in the parameter recognition information table 741, that is, (recording speed, recording layer, WS indication information)=(2,2,2), is recorded.

In the parameter recognition information table 751 of the disk information structure #5 750, recording speed="2", recording layer="1", and WS indication information="3," is recorded. In the parameter table 752, recording related parameter information on the information included in the parameter recognition information table 751, that is, (recording speed, recording layer, WS indication information)=(2,1,3), is recorded.

In the parameter recognition information table 761 of the disk information structure #6 760, recording speed="2", recording layer="2", and WS indication information="3," is recorded. In the parameter table 762, recording related parameter information on the information included in the parameter recognition information table 761, that is, (recording speed, recording layer, WS indication information)=(2,2,3), is recorded.

In the parameter recognition information table 771 of the disk information structure #7 770, recording speed="4", recording layer="1", and WS indication information="3," is recorded. In the parameter table 772, recording related parameter information on the information included in the parameter recognition information table 771, that is, (recording speed, recording layer, WS indication information)=(4,1,3), is recorded.

In the parameter recognition information table 781 of the disk information structure #8 780, recording speed="4", recording layer="2", and WS indication information="3," is recorded. In the parameter table 782, recording related parameter information on the information included in the parameter recognition information table 781, that is, (recording speed, recording layer, WS indication information)=(4,2,3), is recorded.

Generally, a new WS is required by addition of a new transfer rate, and by defining a disk information structure and recording the structure on a medium according to an embodiment of the present invention, as described above, compatibility among standards can be guaranteed.

For example, if a rewritable information storage medium 430 manufactured complying with the third standard is placed on the drive system 421 supporting the second standard, the drive system 421 can quickly obtain disk information structures corresponding to the second standard among disk information structures recorded on the disk information area of the rewritable information storage medium 430, from the parameter recognition information table, while maintaining compatibility. That is, when the rewritable information storage medium 430 is placed on the drive system 421, if the drive system 421 desires to record data on the first recording layer of the medium 430 with a recording speed of 2×, then, the drive system 421 first finds a disk information structure in which values of a parameter recognition information table are (recording speed, recording layer, WS indication information)=(2,1,2), among disk information structures of the disk information area of the medium 430, and by referring to recording related parameters in the parameter table of this disk information structure, can perform recording data. The reason for finding the disk information structure of WS indication information="2" is that WS B is the only WS that can be applied to the 2× transfer rate in a drive system supporting the second standard. Also, in the present embodiment, "2" is the only representative number indicating WS B.

By managing disk information structures, scalability as well as compatibility with other media can be guaranteed and therefore, the present invention has the advantage of being able to accommodate a future increase in the numbers of recording layers, recording speeds, and WSes. Also, by preparing these rules, uniformity and compatibility of standards between a rewritable information storage medium and a write once information storage medium can be achieved.

The plurality of disk information structures as described above are recorded in a disk information area of a disk, and are recorded in advance when the disk is manufactured. For example, as shown in FIG. 2, these can be recorded in a pre-recorded zone of a lead-in area. However, the zone is just an example and the structures can be recorded in any area that can store the disk information structures in a disk that can be available in the future.

Also, the explanation of the disk information structures as presented above indicates the logical structure of a disk information structure, and does not limit it to a physical structure. That is, it does not limit the disk information structure to the fact that the disk information structure is actually divided into physical areas of a common information table, a parameter recognition information table, and a parameter table, but rather the information stored in the disk information structure can be logically divided as in the embodiment of the present invention.

Figure 8:
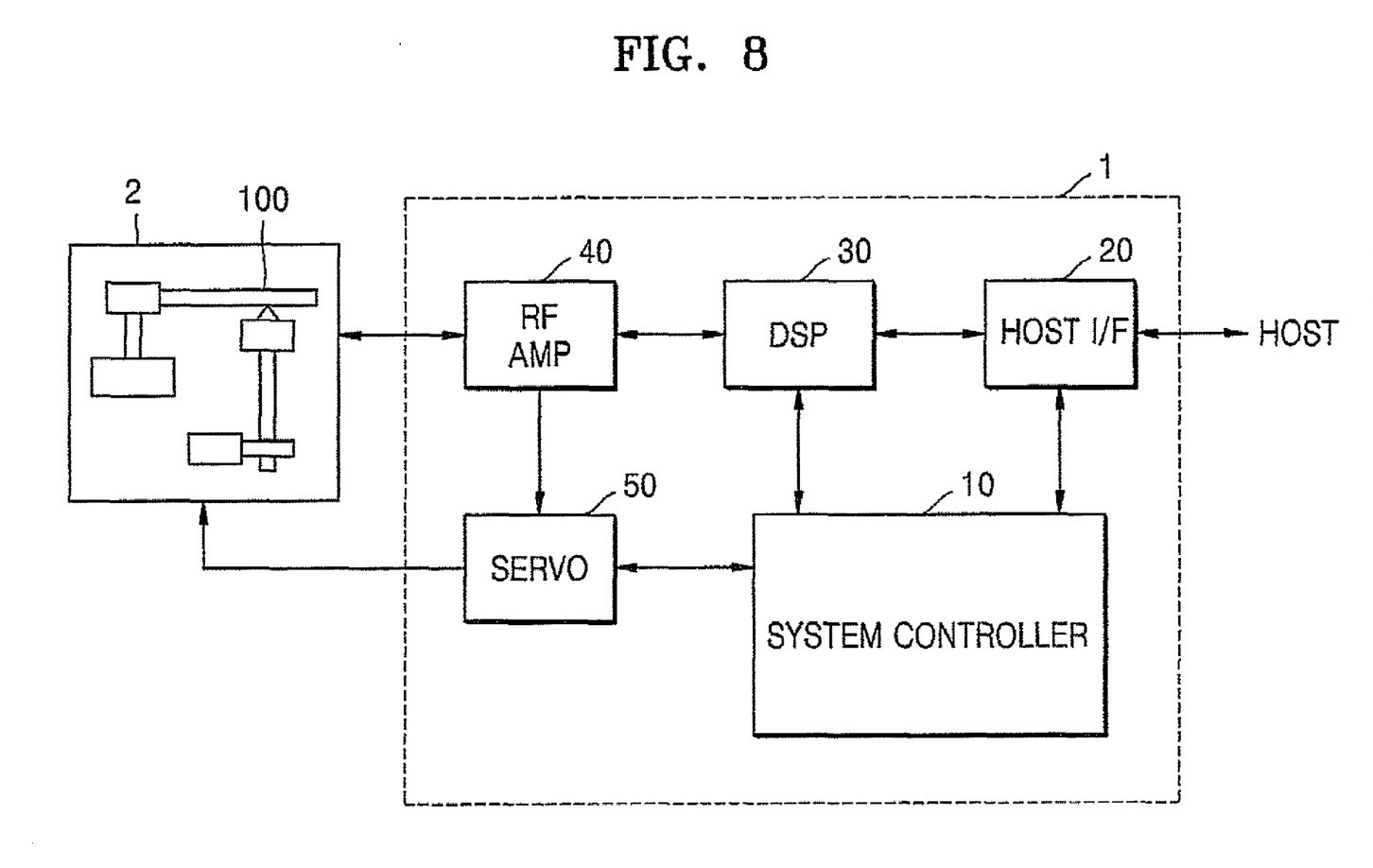
FIG. 8 is a diagram showing an embodiment of a recording and/or reproducing apparatus according to an embodiment of the present invention.

FIG. 8 is a diagram showing an embodiment of a recording and/or reproducing apparatus according to an embodiment of the present invention.

Referring to FIG. 8, the recording and/or reproducing apparatus includes a writing and/or reading unit 2 and a control unit 1.

The writing and/or reading unit 2 has a pickup and other parts and writes data on and/or reads data from a disk 100 that is an optical recording information storage medium on which a disk information structure according to an embodiment of the present invention is recorded.

The control unit 1 controls the writing and/or reading unit 2 such that data is written to and read from the disk 100 according to a predetermined file system.

In particular, when the disk 100 is loaded, the control unit 1 according to an embodiment of the present invention controls the writing and/or reading unit 2, such that a plurality of disk information structures are read from the disk 100, a disk information structure appropriate to this recording and/or reproducing apparatus from the disk information structures is found, and by using parameters of the found disk information structure, data is recorded on or read from the disk 100.

The control unit 1 includes a system controller 10, a host I/F 20, a DSP 30, an RF AMP 40 and a servo 50.

When data is recorded, the host I/F 20 receives a predetermined write command from a host and transmits the command to the system controller 10. The system controller 10 controls the DSP 30 and the servo 50 in order to perform this write command received from the host I/F 20. For error correction, the DSP 30 adds additional data, such as a parity, to the data received from the host I/F 20 and to the data to be recorded, performs error correction code (ECC) encoding to generate an ECC block that is an error correction block, and then modulates the generated ECC block in a predetermined method. The RF AMP 40 converts the data output from the DSP 30 into an RF signal. The writing and/or reading unit 2 having a pickup records the RF signal transmitted by the RF AMP 40 on the disk 100. The servo 50 receives a command input required for servo control from the system controller 10 and servo controls the pickup of the writing and/or reading unit 2. In particular, the system controller 10 according to an embodiment of the present invention reads a plurality of disk information structures recorded on the disk 100, and finds a disk information structure appropriate to this recording and/or reproducing apparatus from the parameter recognition information tables of the disk information structures. For example, the system controller 10 searches recording speeds, recording layers, and WS indication information recorded in the parameter recognition information tables for a parameter recognition information table having the same information as the recording speed of the system controller 10, the recording layer on which the system controller 10 desires to record data, and WS indication information of a WS that the system controller 10 can support. Then, by referring to recording related parameters included in the parameter table of the disk information structure which includes the parameter recognition information table, the system controller 10 controls the elements of the control unit 1, such that each element of the control unit 1 is set and according to the setting, data is recorded on the disk 100.

When data is reproduced, the host I/F 20 receives a reproduction command from the host. The system controller 10 performs initialization required for reproduction. The writing and/or reading unit 2 irradiates a laser beam on the disk 100, and outputs an optical signal from the laser beam reflected from the disk 100. The RF AMP 40 converts the optical signal output from the writing and/or reading unit 2 into an RF signal, and provides modulated data obtained from the RF signal to the DSP 30, while providing a servo signal for control obtained from the RF signal, to the servo 50. The DSP 30 demodulates the modulated data and outputs data obtained through ECC error correction. Meanwhile, the servo 50 receives a service signal from the RF AMP 40 and a command required for servo control received from the system controller 10, and performs servo control for the pickup. The host I/F 20 transmits data received from the DSP 30 to the host. In particular, the system controller 10 according to an embodiment of the present invention reads a plurality of disk information structures recorded on the disk 100, and finds a disk information structure appropriate to this recording and/or reproducing apparatus from the parameter recognition information tables of the disk information structures. Though recording related parameters are mainly explained above with reference to FIGS. 3 through 7, when data is reproduced, if there is a plurality of reproduction related parameters, a disk information structure can also be applied to reproduction related parameters in a similar manner to the disk information structure on which recording related parameters are recorded. For example, the system controller 10 searches reproduction related indication information recorded in the parameter recognition information tables and finds a parameter recognition information table containing information appropriate to the reproduction characteristics of the system controller 10, and by referring to reproduction related parameters included in the parameter table of the disk information structure including the parameter recognition information table, controls such that each element of the control unit 1 is set and according to the setting, data recorded on the disk 100 is reproduced.

The recording and/or reproducing apparatus shown in FIG. 8 can be implemented as separate recording apparatus and reproducing apparatus, or as one recording and reproducing apparatus.

Figure 9:
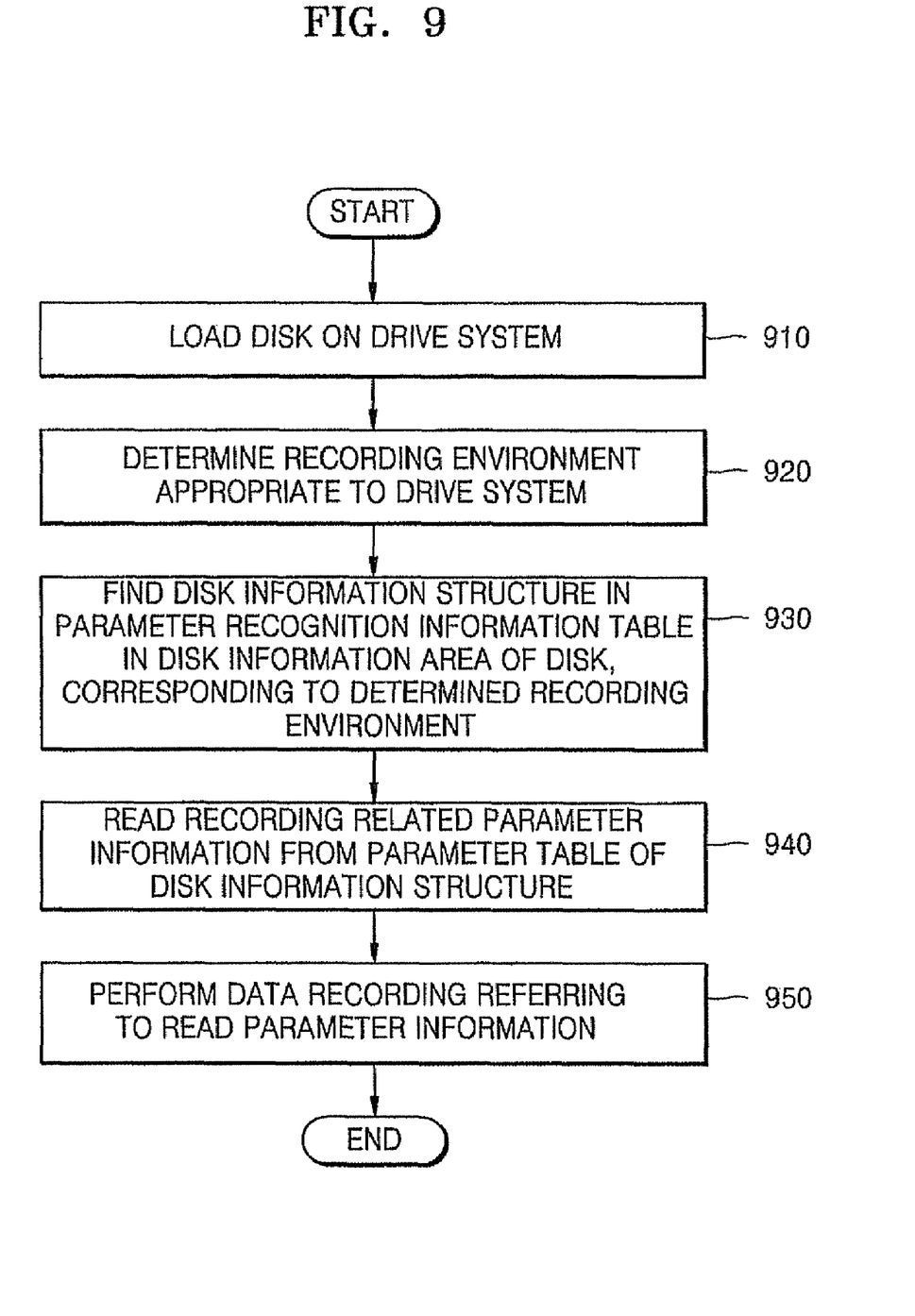
FIG. 9 is a flowchart of a recording and/or reproducing method according to an embodiment of the present invention.

FIG. 9 is a flowchart of the operations performed by a recording and/or reproducing method according to an embodiment of the present invention.

First, a disk is placed on a drive system in operation 910. The system controller 10 of the drive system determines a recording environment appropriate to this drive system in operation 920. For example, it can be determined which recording speed this drive system supports, which recording layer of the disk the system controller 10 desires data to be recorded on, or which WS this drive system supports. Of course, here, the meaning of determining includes simply reading these values in an internal memory of this drive system.

Next, the system controller 10 finds a disk information structure corresponding to the determined recording environment from parameter recognition information tables in the disk information area of the disk in operation 930. That is, the system controllers reads disk information structures recorded in the disk information area of the disk and finds a parameter recognition information table containing the same information as the determined recording environment, that is, the recording layer, recording speed and WS indication information, from the disk information structures.

Next, the system controller 10 reads recording related parameters from the parameter table of the disk information structure including the found parameter recognition information table in operation 940.

Then, by referring to thus read parameter information, the system controller 10 sets the drive system and controls the drive system such that in the set state, data is recorded on the disk in operation 950.

The recording and/or reproducing methods as described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to an embodiment of the present invention as described above, by forming a logical parameter recognition information table containing a recording speed, a recording layer, and WS indication information, in a disk information structure, in a medium on which one or more disk information structures are recorded, a recording speed and a recording layer which recording related parameters in the parameter table of each disk information structure desires to apply, and which write strategy the recording related parameters are associated with can be quickly known from the parameter recognition information table in the disk information structure.

Also, even when a recording speed, a recording layer, and WS are added in a future disk standard, this disk information structure can be scaled up such that compatibility can be guaranteed.

Furthermore, by determining this rule between different standards, compatibility between, for example, a standard for a write once recording medium and a standard for a rewritable recording medium can be achieved.

What is claimed is:

1. A method for recording data on an optical recording medium the method comprising:

reading at least one disk information structure from the optical recording medium, each disk information structure comprising a pair of tables, a first table comprising recording characteristics information comprising a recording speed and a write strategy (WS) indication information, the write strategy indication information being information on a type of write strategy, and a second table comprising recording related parameters being used in setting the apparatus to a condition corresponding to the recording speed and the write strategy (WS) indication information, the recording related parameters comprising power level information and duration information of predetermined pulse;

determining recording characteristics comprising a recording speed and a write strategy, to be applied to the optical recording medium;

selecting one disk information structure corresponding to the determined recording characteristics from the at least one disk information structure using recording characteristic information in the first table;

reading recording related parameters corresponding to the information on recording characteristics, from the selected disk information structure recorded on the recording medium; and setting the recording/reproducing apparatus using the read recording related parameters; and recording data on the optical recording medium.

2. The method of claim 1, wherein in each disk information structure, the recording speed of the recording characteristics information in the first table indicates a recording speed to which the recording related parameters in the second table is applicable.

3. The method of claim 1, wherein in each disk information structure, the write strategy (WS) indication information of the recording characteristics information in the first table indicates a write strategy (WS) of the recording related parameters in the second table.

* * * * *